(12) United States Patent  (10) Patent No.: US 6,619,229 B1
Lush                      (45) Date of Patent: Sep. 16, 2003

(54) SQUIRREL TEASING HANGER ASSEMBLY FOR A BIRD FEEDER

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 0 days.

(21) Appl. No.: 10/288,656

(22) Filed: Nov. 5, 2002

(51) Int. Cl.[7] .............................................. A01K 61/02
(52) U.S. Cl. ...................... 119/57.9; 119/52.3; 119/52.4
(58) Field of Search .............................. 119/52.3, 52.4, 119/57.9

(56) References Cited

U.S. PATENT DOCUMENTS

| 5,191,857 | A | * | 3/1993 | Boaz | 119/52.3 |
| 5,886,631 | A | | 3/1999 | Ralph | 340/541 |
| 5,937,788 | A | * | 8/1999 | Boyd | 119/57.9 |
| 6,119,627 | A | * | 9/2000 | Banyas et al. | 119/57.9 |
| 6,378,458 | B1 | * | 4/2002 | Boyd | 119/52.3 |
| 6,401,658 | B1 | * | 6/2002 | Teets | 119/57.9 |
| 6,408,789 | B1 | | 6/2002 | Hsiao | 119/57.9 |
| 6,561,128 | B1 | * | 5/2003 | Carter | 119/57.9 |

* cited by examiner

Primary Examiner—Charles T. Jordan
Assistant Examiner—Judith A. Nelson
(74) Attorney, Agent, or Firm—Thomte, Mazour & Niebergall; Dennis L. Thomte

(57) ABSTRACT

A squirrel teasing hanger assembly for a bird feeder emits sounds or illuminates lights when a squirrel or large bird alights on the bird feeder attached a lower support of the hanger assembly.

15 Claims, 2 Drawing Sheets

SQUIRREL TEASING HANGER ASSEMBLY FOR A BIRD FEEDER

BACKGROUND OF THE INVENTION

1. Field of the Invention

This invention relates to a squirrel teasing hanger assembly for a bird feeder or the like and more particularly to a squirrel teasing hanger for a bird feeder which is activated by the weight of the squirrel thereon or which may be activated by a remote control. More particularly, the teaser hanger assembly emits sounds, illuminates lights or mildly shocks the squirrel when the device is activated.

2. Description of the Related Art

Several types of bird feeders have been designed for preventing unwanted animals such as squirrels from eating the bird food in the feeder. Little prior art exists on rodent repelling hangers where various types of plants, feeders and bird shelters may be hung therefrom. One type of bird feeder has weight-sensitive tiltable perches thereon so when a squirrel or large bird lands on the perch, the perch moves and dislodges the animal. This type of bird feeder is shown in Loken U.S. Pat. No. 5,105,765; Wessner U.S. Pat. No. 5,048,461; and Dehls U.S. Pat. No. 4,541,362.

Another type of device uses a shocking system to send an electric impulse into the unwanted animal when that animal attempts to eat from the feeder. This type of device is shown in Fry U.S. Pat. No. 5,392,732 and Collins U.S. Pat. No. 5,471,951.

Still another type of repelling device uses weight-sensitive devices to discourage the unwanted animal from feeding from the feeder. This device shuts off the food supply when a heavy animal or bird lands upon the perch. This type of device is taught in Drakos U.S. Pat. No. 5,720,238.

Yet another type of repelling device to which the present invention pertains senses the excessive weight of a squirrel or unwanted bird and removes the unwanted animal at a predetermined point in time. This type of device is taught in Hibbard U.S. Pat. No. 5,297,503; Korb U.S. Pat. No. 5,690,056; and Banyas U.S. Pat. No. 6,119,627.

Applicant has also filed a patent application on a squirrel repelling hanger for a bird feeder or the like which has been assigned Ser. No. 09/957,402 under the filing date of Sep. 20, 2001.

Although the squirrel repelling devices of the prior art are noteworthy, there are many instances when a person does not wish to repel squirrels from the bird feeder but wish to tease or play with the same without necessarily repelling the squirrel from the apparatus.

SUMMARY OF THE INVENTION

A squirrel teasing hanger assembly for a bird feeder or the like is disclosed comprising a housing having upper and lower ends with a lower support extending downwardly from the lower end of the housing which is movable between upper and lower positions with respect to the housing. The lower support is adapted to have a bird feeder or the like suspended therefrom. An upper support extends upwardly from the upper end of the housing for attachment to a supporting member such as a tree branch or the like. A sound-producing device is mounted in the housing and is powered by a battery-powered circuit in the housing. The lower support has a first electrical contact thereon which is movable with the lower support between its upper and lower positions. A second electrical contact is provided in the housing which is engaged by the first electrical contact when the lower support is in its lower position and which is spaced from the first electrical contact when the lower support is in its upper position. The first and second electrical contacts are electrically connected to the battery powered circuit whereby the sound producing device will be activated when the first electrical contact is moved into electrical contact with the second electrical contact when the lower support has been moved to its lower position such as will be caused by the weight of a squirrel on the bird feeder. The sound-producing device will emit a sound such as that of a cat, dog, eagle, hawk, etc. Additionally, a light-emitting device is provided on the housing which will be illuminated to startle the squirrel on the bird feeder. For enjoyment purposes, the sound producing device and the light-emitting device may be actuated by a remote control circuit.

It is therefore a principal object of the invention to provide a squirrel teasing hanger assembly for a bird feeder or the like.

A further object of the invention is to provide a teasing hanger assembly for a bird feeder or the like which is actuated when a squirrel or large bird is on the bird feeder.

Yet another object of the invention is to provide a squirrel teasing hanger assembly for a bird feeder or the like which is remotely controlled.

Still another object of the invention is to provide a squirrel teasing hanger assembly for a bird feeder or the like which may mildly shock a squirrel on the bird feeder.

Still another object of the invention is to provide a squirrel teasing hanger assembly for a bird feeder or the like which emits sounds when the weight of a squirrel or bird on the bird feeder actuates the same.

These and other objects will be obvious to those skilled in the art.

DESCRIPTION OF THE PREFERRED EMBODIMENT

Figure 1:
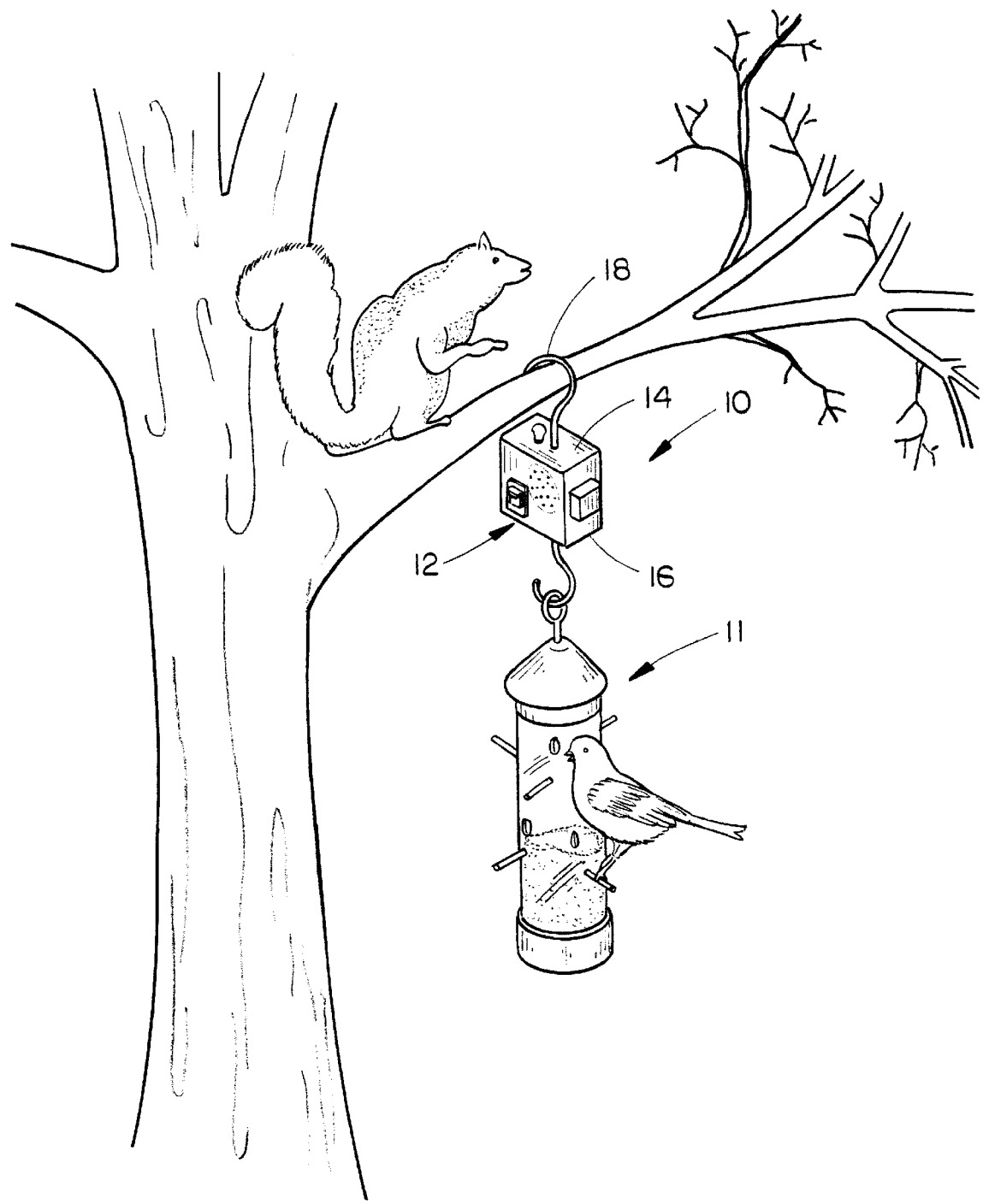
FIG. 1 is a perspective view of the present invention positioned between a tree limb and a bird feeder.
Figure 2:
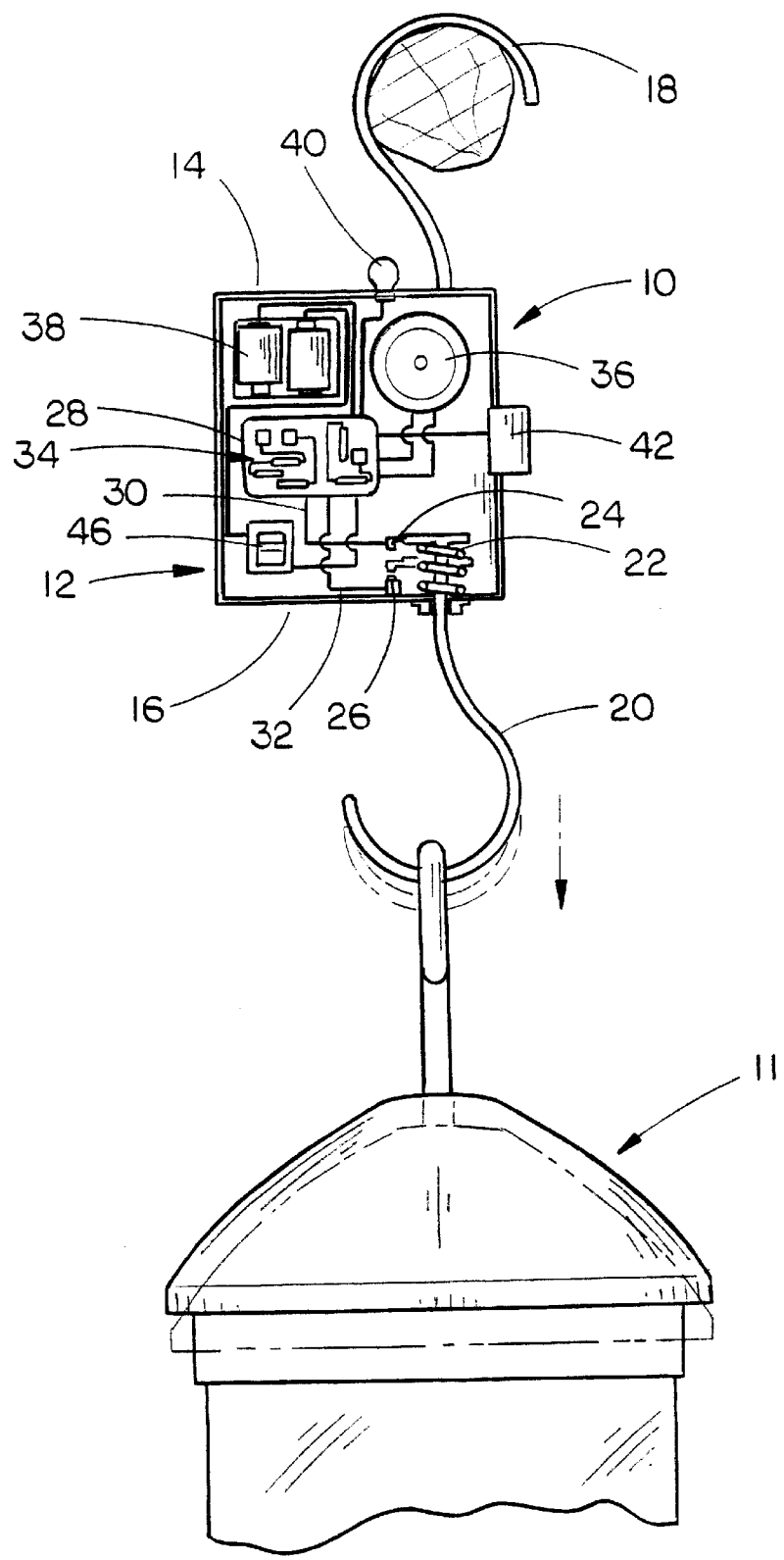
FIG. 2 is a side view illustrating the invention.

The squirrel teasing hanger assembly for a bird feeder or the like of this invention is referred to generally by the reference numeral 10 which is designed to support a bird feeder 11 having food therein. The hanger assembly 10 generally includes an enclosed housing 12 having an upper end 14 and a lower end 16. An upper hook or support 18 is secured to the housing and extends upwardly therefrom for mounting the same on a tree branch or the like such as illustrated in FIGS. 1 and 2.

The numeral 20 refers to a lower support in the form of a hook or the like to which the bird feeder 11 may be connected. Preferably, the lower support 20 is constructed of an electrically conductive metal material for a purpose to be described hereinafter. Lower support 20 is movable between upper and lower positions relative to the housing 12. Metal spring 22 is provided in the housing 12 for yieldably maintaining lower support 20 in its upper position. An electrical contact 24 is electrically connected to the upper portion of the lower support 20 and is adapted to engage an electrical contact 26 when the lower support 20 is in its lower position. Contact 24 is connected to a conventional circuit board 28 by lead 30. Contact 26 is electrically connected to the circuit board 28 by lead 32.

The, numeral 34 refers to a sound producing mechanism of conventional construction which when activated emits sounds through a speaker 36 provided in the housing 12. The circuit board and the circuitry associated therewith are powered by batteries 38. The numeral 40 refers to a light emitting device such as a light bulb or the like which is activated at the same time the sound producing mechanism 34 is activated. The numeral 42 refers to a conventional remote control receiver which is connected to the circuitry for activating the circuitry upon receiving a signal from a conventional remote control. An on-off switch 46 is also provided.

The resiliency of the spring 22 is such that when a filled bird feeder 11 is supported on the lower support 20, the electrical contacts 24 and 26 will be spaced from one another. If the on-off switch 46 is in the "on" position, the sound producing mechanism 34 and the light emitting device 40 may be remotely activated. If the on-off switch is "on," the weight of a squirrel or large bird on the bird feeder 11 will cause the lower support 20 to move to its lower position so that the contacts 24 and 26 are electrically engaged to activate the sound producing mechanism 34 and the light 40. Preferably, the sound producing mechanism 34 emits the sound of a cat, dog, eagle, hawk, or other animal. Thus, when a squirrel is on the bird feeder 11, the squirrel is teased or startled by the action of the sound producing mechanism 34 or the light 40.

If the upper end of the bird feeder 11 is constructed of a metal material, and if the contact 24 is electrically connected to the upper end of the lower support 20, a mild electrical current will pass through the lower support 20, and into the upper end of the bird feeder to mildly shock the squirrel if the squirrel is in contact with the metal portion of the upper end of the bird feeder.

Thus it can be seen that a novel squirrel teasing hanger assembly for a bird feeder or the like has been provided which accomplishes at least all of its stated objectives.

I claim:

1. A squirrel or bird teasing hanging assembly, for a bird feeder, said hanging assembly comprises:

a housing having upper and lower ends;

a lower support, extending downwardly from said, lower end of said housing, which is movable between upper and lower positions with respect to said housing;

said support adapted to have a bird feeder suspended therefrom;

an upper support extending upwardly from said upper end of said housing for attachment to a supporting member;

a sound producing device mounted on said housing;

a battery-powered circuit in said housing for powering said sound producing device;

said lower support having a first electrical contact thereon which is movable with said lower support between its said upper and lower positions;

and a second electrical contact in said housing which is engaged by said first electrical contact when said lower support is in its said lower position and which is spaced from said first electrical contact when said lower support is in its said upper position;

said first and second electrical contacts being electrically connected to said battery-powered circuit whereby said sound producing device will be activated when said first electrical contact is moved into electrical contact with said second electrical contact when said lower support has been moved to its said lower position;

said lower support moving from its said upper position to its said lower position when a squirrel or large bird moves onto the bird feeder.

2. The squirrel teasing hanging assembly of claim 1 wherein a remote control receiver is electrically connected to said battery-powered circuit whereby said sound producing device will be activated when said remote control receive receives a signal from a remote control.

3. The squirrel teasing hanging assembly of claim 1 wherein said battery-powered circuit also includes a manual on-off switch.

4. The squirrel teasing hanging assembly of claim 1 wherein a light emitting device is mounted on said housing and is electrically connected to said battery-operated circuit.

5. The squirrel teasing hanging assembly of claim 1 wherein said lower support is comprised of an electrically conductive material whereby a squirrel in physical contact with said lower support or an electrically conductive member secured to said lower support will receive a mild electrical shock upon the weight of the squirrel causing said lower support to move to its said lower position.

6. The squirrel teasing hanging assembly of claim 1 wherein a spring is in engagement with said lower support for yieldably maintaining said lower support in its said upper position.

7. A squirrel or bird teasing hanging assembly, for a bird feeder, said hanging assembly comprises:

a housing having upper and lower ends;

a lower support, extending downwardly from said lower end of said housing which is, movable between upper and lower positions with respect to said housing;

said support adapted to have a bird feeder suspended therefrom;

an upper support extending upwardly from said upper end of said housing for attachment to a supporting member;

a light emitting device on said housing;

a battery-powered circuit in said housing for powering said light emitting device;

said lower support having a first electrical contact thereon which is movable with said lower support between its said upper and lower positions;

and a second electrical contact in said housing which is engaged by said first electrical contact when said lower support is in its said lower position and which is spaced from said first electrical contact when said lower support is in its said upper position;

said first and second electrical contacts being electrically connected to said battery-powered circuit whereby the said light emitting device will be activated when said first electrical contact is moved into electrical contact with said second electrical contact when said lower support has been moved to its said lower position.

8. The squirrel teasing hanging assembly of claim 7 wherein a remote control receiver is electrically connected to said battery-powered circuit whereby said light emitting device will be activated when said remote control receive receives a signal from a remote control.

9. The squirrel teasing hanging assembly of claim 7 wherein said battery-powered circuit also includes a manual on-off switch.

10. The squirrel teasing hanging assembly of claim 7 wherein said lower support is comprised of an electrically conductive material whereby a squirrel in physical contact with said lower support or an electrically conductive member secured to said lower support will receive a mild electrical shock upon the weight of the squirrel causing said lower support to move to its said lower position.

11. The squirrel teasing hanging assembly of claim 7 wherein a spring is in engagement with said lower support for yieldably maintaining said lower support in its said upper position.

12. The squirrel teasing hanging assembly of claim 1 wherein said sound producing device emits the sound of an animal.

13. The squirrel teasing hanging assembly of claim 1 wherein said sound producing device emits the sound of a hawk or eagle.

14. The squirrel teasing hanging assembly of claim 1 wherein said sound producing device emits the sound of a cat.

15. The squirrel teasing hanging assembly of claim 1 wherein said sound producing device emits the sound of a dog.

* * * * *